(12) United States Patent
Moore et al.

(10) Patent No.: US 9,347,572 B2
(45) Date of Patent: May 24, 2016

(54) BI-DIRECTIONAL HYDRAULIC FLOW CONTROL VALVE

(71) Applicant: JC Bamford Excavators Limited, Uttoxeter, Staffordshire (GB)

(72) Inventors: Anthony Edward Moore, Uttoxeter (GB); Oldrich Novak, Uttoxeter (GB); Peter Swinnerton, Uttoxeter (GB)

(73) Assignee: JC Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 14/597,122

(22) Filed: Jan. 14, 2015

(65) Prior Publication Data

US 2015/0198213 A1     Jul. 16, 2015

(30) Foreign Application Priority Data

Jan. 15, 2014 (GB) .................................. 1400611.8

(51) Int. Cl.
| | | |
|---|---|---|
| *F16K 15/02* | (2006.01) | |
| *B60G 17/08* | (2006.01) | |
| *F16F 9/348* | (2006.01) | |
| *F16F 9/512* | (2006.01) | |

(52) U.S. Cl.
CPC .............. *F16K 15/026* (2013.01); *B60G 17/08* (2013.01); *F16F 9/3485* (2013.01); *F16F 9/5126* (2013.01); *B60G 2202/24* (2013.01); *B60G 2500/112* (2013.01); *B60G 2800/162* (2013.01); *Y10T 137/7929* (2015.04)

(58) Field of Classification Search
CPC ..... F16F 9/3488; F16F 9/3485; F16F 9/3405; F16F 9/3214; F16F 9/5126; F16F 2238/04; F16K 15/026; B60G 17/08; B60G 2202/24; B60G 2800/162; B60G 2500/112
See application file for complete search history.

(56) References Cited

U.S. PATENT DOCUMENTS

| | | | | |
|---|---|---|---|---|
| 3,718,159 | A  * | 2/1973 | Tennis | 137/596.12 |
| 6,371,264 | B1 * | 4/2002 | Deferme | 188/322.15 |
| 6,464,053 | B1 * | 10/2002 | Hoebrechts | 188/322.15 |
| 6,899,207 | B2 * | 5/2005 | Deferme et al. | 188/282.5 |
| 2005/0056505 | A1 * | 3/2005 | Deferme | 188/322.15 |
| 2006/0283676 | A1 * | 12/2006 | Deferme | 188/322.13 |
| 2007/0034466 | A1 | 2/2007 | Paesmans et al. | |
| 2012/0247889 | A1 | 10/2012 | Yabe et al. | |

FOREIGN PATENT DOCUMENTS

| | | |
|---|---|---|
| DE | 4 024 789 C1 | 12/1991 |
| DE | 10 2012 204 530 A1 | 10/2012 |
| GB | 2 427 456 A | 12/2006 |
| GB | 2 442 188 A | 3/2008 |

(Continued)

OTHER PUBLICATIONS

Search Report for GB 1400611.8, dated Aug. 8, 2014.

(Continued)

*Primary Examiner* — Drew Brown
(74) *Attorney, Agent, or Firm* — Marshall, Gerstein & Borun LLP

(57) ABSTRACT

A flow control valve for a hydropneumatic suspension comprises a circular valve body including a flow restriction and a plurality of flow relief passages closed at one side by respective leaf springs. Further flow relief is provided by a reciprocal central sleeve which contains the flow restrictor and is movable to unseat one or both leaf springs.

20 Claims, 7 Drawing Sheets

(56) References Cited

FOREIGN PATENT DOCUMENTS

| WO | WO-0163141 | A1 | 8/2001 |
| WO | WO-2007022921 | A1 | 3/2007 |

OTHER PUBLICATIONS

Extended European Search Report from Application No. 14196448.3 dated Jun. 30, 2015.

* cited by examiner

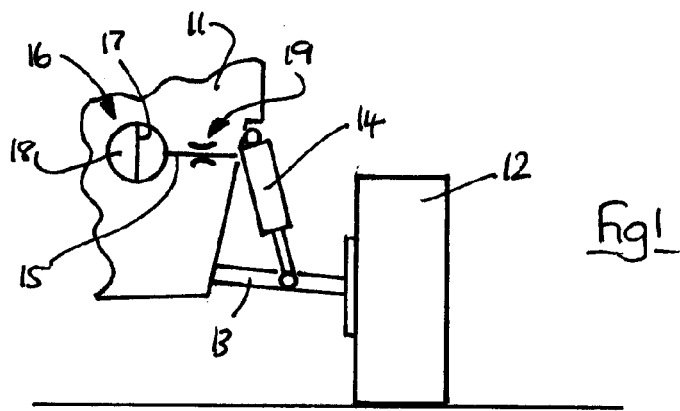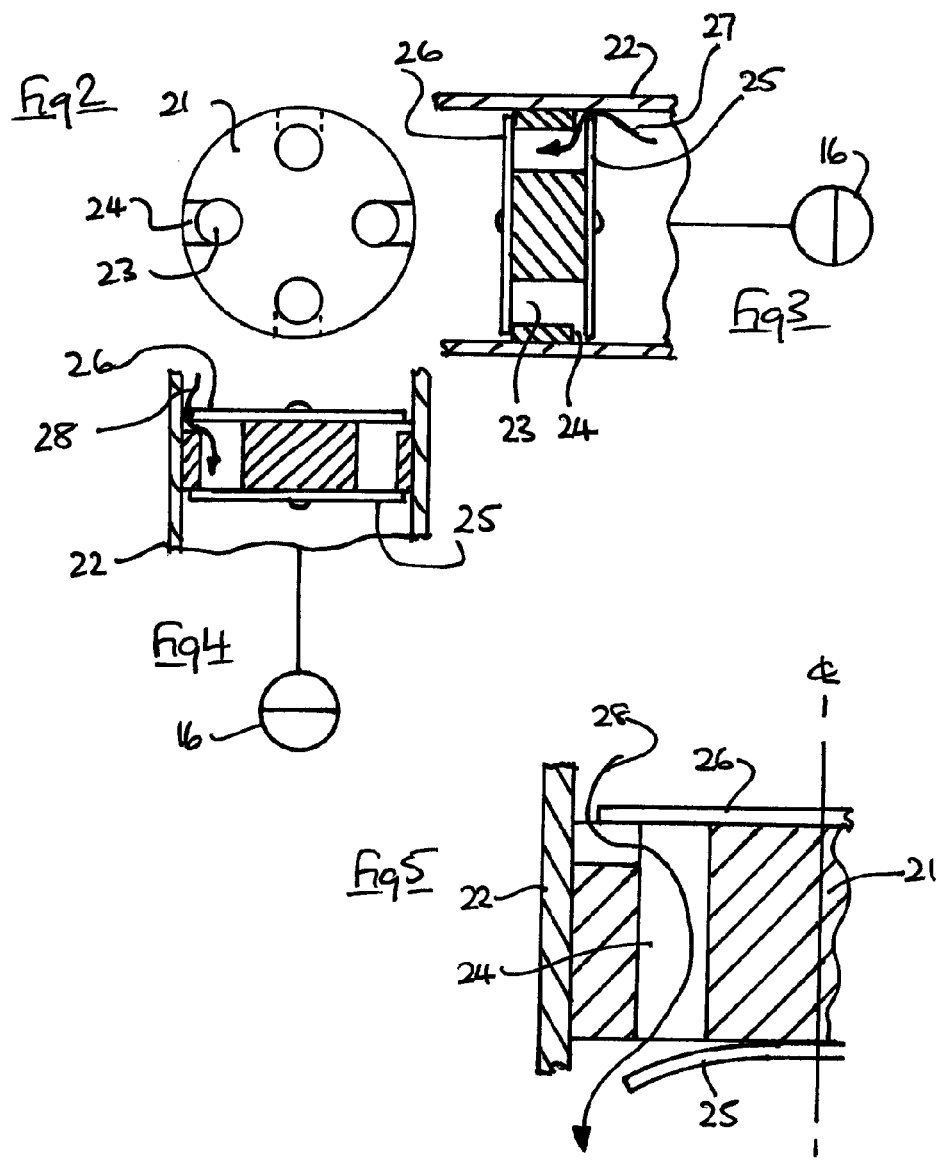

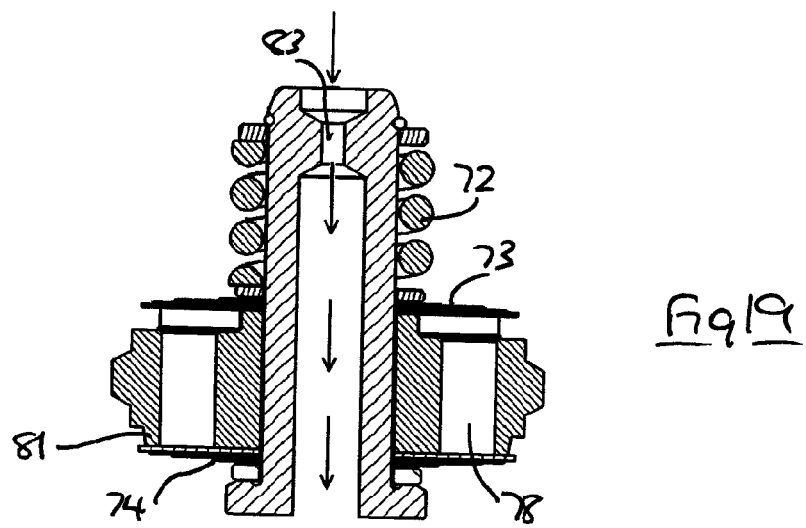
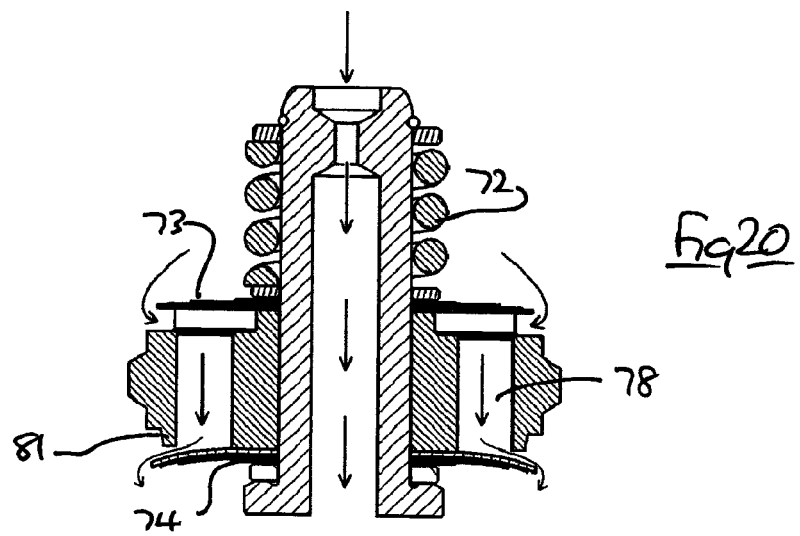
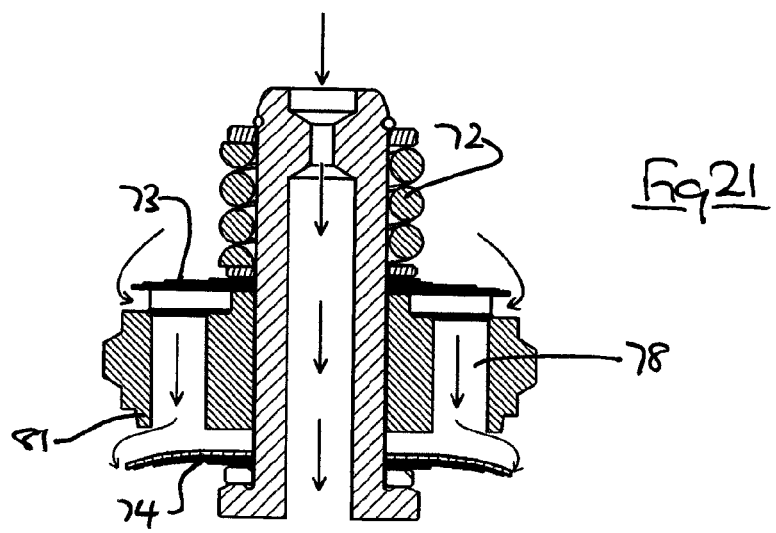

BI-DIRECTIONAL HYDRAULIC FLOW CONTROL VALVE

TECHNICAL FIELD

The present invention relates to a control valve of a hydraulic duct, the valve being adapted to control hydraulic flow in both directions through the duct.

BACKGROUND OF THE INVENTION

Hydraulic systems rely upon flow of a hydraulic fluid, typically an oil or water based liquid, to achieve a desired effect. One example of such a system is a hydropneumatic suspension of a vehicle, in which road wheels are mounted on respective hydraulic actuators, and springing is provided by a hydropneumatic suspension module containing a springing medium, such as nitrogen gas. Suspension modules are typically in the form of a sphere having a diaphragm separating hydraulic fluid from a suspension gas under pressure. Working of the suspension causes movement of hydraulic fluid to and from the sphere. Such suspension systems are well known and need not be further described here.

As the hydraulic fluid moves to and from the suspension module, some means of damping must be provided to reduce the amplitude of suspension movement. Orifices and spring loaded relief valves have been proposed to allow suspension characteristics to be tuned for optimized ride and handling of the vehicle. The characteristics for bump and rebound are usually different, so that typically the fluid flow path in the bump (upward) direction of a wheel is different from that of the rebound (downward) direction of a wheel.

Some kinds of vehicle, particularly agricultural and construction vehicles, are designed to operate both on and off highway. The respective ranges of suspension movement are significantly different, so that a suspension optimized for on-highway use may be too hard for off-highway use. Conversely a suspension capable of accommodating wheel deflections in off-highway use may be uncomfortably soft in on-highway conditions. In either case the speed of travel of a vehicle may be severely limited if used on terrain for which the suspension is not optimized. A driver selectable alternative increases expense and complication, and is preferably avoided.

SUMMARY OF THE INVENTION

It would be desirable to have a simplified bi-directional flow control valve with several integrated features to permit tuning thereof, particularly to accommodate ranges of suspension movement appropriate for both on-highway and off-highway vehicle use.

According to the invention there is provided a flow control valve for a hydraulic conduit, said valve comprising a valve body having an open through passage defining a flow restriction, and an arcuate array of flow relief passages, each of said relief passages having at one side a closure comprising a leaf spring, and at least one said leaf spring being provided at each side of the valve body, wherein said valve includes a piston reciprocal in said body, said piston having end abutments to limit travel thereof, said piston being resiliently biased in one direction to permit said one end abutment to seat a corresponding leaf spring at one side of said body, and being movable under increasing hydraulic pressure to unseat said corresponding leaf spring, thereby to open a respective relief passage.

Such a bi-directional valve is substantially symmetrical and relatively straightforward to manufacture whilst being tunable for both bump and rebound.

The open through passage may be provided in said piston, for example as an axial opening of a substantial annular piston.

The array of relief passage may be circular and equispaced. The leaf springs may be circular and annular, and the lip thereof may lift under pressure to provide a first relief opening. A second relief opening is provided by sliding motion of the piston within the body.

In one embodiment a double acting relief valve has two-stage relief available for both directions of hydraulic flow (bump and rebound), both stages on each side being independently tunable.

Such a valve provides damping and flow relief suitable for on-highway travel, yet can provide for additional suspension travel in off-highway travel whilst maintaining an acceptable ride and handling characteristic at speed.

Features of the invention will be apparent from the appended claims.

BRIEF DESCRIPTION OF DRAWINGS

Other features of the invention will be apparent from the following description of a preferred embodiment illustrated by way of example only in the accompanying drawings in which:

FIG. 1 illustrates a hydropneumatic wheel suspension of a vehicle.

FIG. 2 illustrates in plan a circular valve element for use in the present invention.

FIG. 3 is a vertical section (as viewed) through the centre of the element of FIG. 2.

FIG. 4 is a horizontal section (as viewed) through the centre of the element of FIG. 2.

FIG. 5 is a partial section showing one mode of operation of the valve element of FIGS. 2-4.

FIGS. 16-21 show schematically the stages of operation of the valve of FIG. 12, in both bump and rebound.

DETAILED DESCRIPTION

Figure 6:
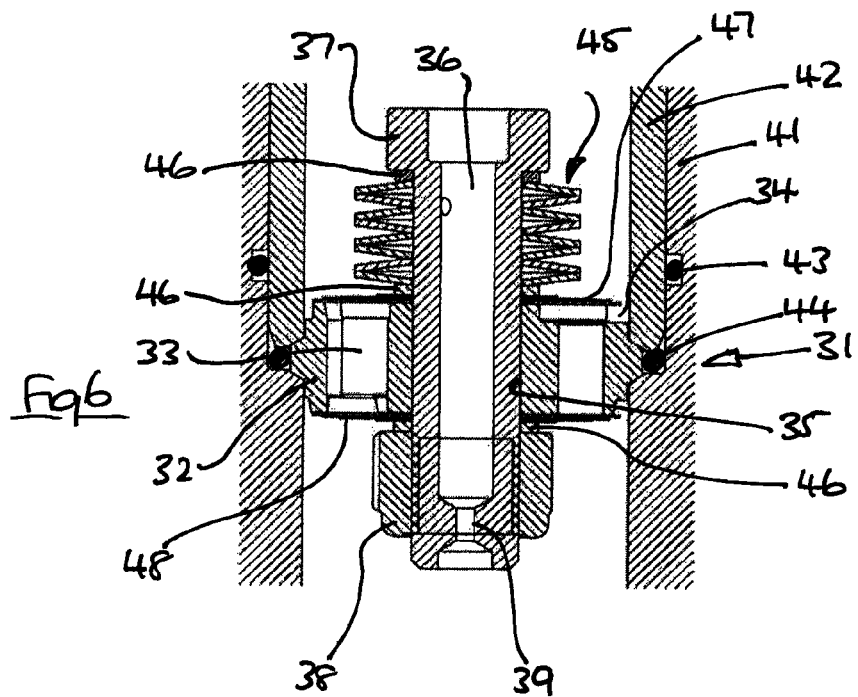
FIG. 6 is a transverse section through a first embodiment according to the invention.

With reference to FIG. 1, a vehicle 11 has a wheel 12 connected thereto by a pivotable suspension arm 13. A hydraulic strut 14 permits suspension movement of the wheel and is coupled via a hydraulic line 15 to a suspension sphere 16 having an internal diaphragm 17 confining pressurized gas 18 on one side thereof. A fluid restrictor 19 provides damping of the movement of hydraulic fluid as the suspension is worked. FIG. 1 illustrates a strut 14 by way of example, but any suitable actuator or motor may be used.

Although an independent suspension of one wheel is illustrated in FIG. 1, this kind of suspension is also fitted to beam axle vehicles.

One element of the invention for inclusion in a practical valve embodiment is illustrated in FIGS. 2-4. A cylindrical body 21 fits closely within a hydraulic duct 22, and has four equispaced through apertures 23. The opposite end faces of the body 21 are planar, and at each side two of the apertures open to the outer periphery via respective slots 24.

The opposite end faces each have a respective spring disc 25, 26 of diameter sufficient to cover the apertures 23, but less than the internal diameter of the duct 22, so that a fluid flow passage is formed from either side as illustrated by arrows 27, 28.

The hydraulic duct is in use part of the hydraulic line 15, and is connected at one side to the suspension sphere 16, and at the other side to the strut 14.

In use fluid flow passing through the slots 24 enters two of the apertures, depending upon the direction of flow; the other two apertures in the same flow direction are blocked by the respective spring disc. At a predetermined pressure, the respective spring disc lifts in the manner of a leaf spring to uncover the apertures on the downstream side, thus allowing the passage of hydraulic fluid (FIG. 5). On the upstream side fluid pressure holds the other spring disc against the body 21. Flow in the opposite direction is controlled in the same manner, and is via the other two apertures.

The valve element of FIG. 2 is simple, and permits considerable tuning of the opening and flow characteristics, for example by altering the number and/or the diameter and/or the shape of the apertures 23, the size of the slots 24, the outside diameter of the discs 25, 26, and the resilience of the discs 25, 26. The characteristics of the flow direction can be adjusted independently of the rebound direction.

A flow control valve in accordance with one embodiment of the invention is illustrated in FIG. 6, and incorporates an element 31 of the kind illustrated in FIGS. 2-5. The element 31 consists of a body 32 having a circular array of through passages 33, some of which allow flow downwards (as illustrated) and some of which allow flow upwards (as illustrated). One slot 34 is shown in FIG. 6, and others are out of the plane of the section illustrated.

The body 32 is retained in a stepped duct 41 by a close-fitting insert 42, and sealing rings 43, 44 are provided in respective grooves to prevent leakage of hydraulic fluid. The duct may form part of an independent hydraulic device, or may be incorporated within the strut 14 or suspension sphere 17 in use.

The body is provided with a central through bore 35 within which is located a sliding piston in the form of a sleeve 36 having an enlarged head 37. Axial movement of the sleeve is restricted by an abutment 38 provided on the opposite end to the head 37. The through passage of the sleeve contains a throat or restrictor 39 which is open but constitutes a restriction to flow of hydraulic fluid therethrough. The restrictor may be quite small, and in one embodiment is a side of the order of 1-2 mm in diameter.

The sleeve 36 is biased upwardly (as viewed) by a stack of Belleville spring washers 45 between the body 32 and head 37, and placed back to back so as to exert a pre-load; suitable thrust washers 46 are included, and it will be understood that in consequence the spring discs 47, 48 are held tightly over the through passages 33.

In practice the sleeve 36 may comprise a screw-threaded bolt having an internal hex head 37 and a self-locking nut as abutment 38. The nut may be used to adjust the pre-load exerted by the stack of spring washers 45.

Operation of the flow control valve of FIG. 6 is as follows. Free flow of hydraulic fluid is permitted in either direction via the throat 39, which constitutes a flow restriction. The area of the throat is tuned (for example by drilling a hole of appropriate diameter) to damp the flow of fluid, and thus cause suspension oscillation to diminish. Such a restrictive throat is suitable for optimizing on-road suspension characteristics.

It is typically desirable to permit greater flow in one direction than the other, for example to give different bounce and rebound characteristics to the invention. Thus, as illustrated, if hydraulic pressure increases at the upper side, by virtue of the flow restriction imposed at the throat 39, such pressure will act via the slot(s) 34 on the spring disc 48, and cause it to bend downwardly (as viewed) so as to open the associated through passage. A further increase in hydraulic pressure causes the sleeve 36 to act as a piston and compress the spring stack 45 to move the abutment 38 downwardly. As a result the spring disc 48 disengages the body 32, and allows additional flow of hydraulic fluid to the downstream side via the respective through passage(s) 33. As fluid pressure on the upper side falls, the sleeve 36 will return upwardly to re-seat the spring disc 48 on the body 32, and allow the through passages 33 to be closed.

This arrangement provides a two-stage relief valve which opens at a predetermined hydraulic pressures, and may provide for the greater suspension movements which are characteristic of off-road travel. It will be understood that the Belleville washers may be arranged in the same or in different directions so as to alter the spring characteristic.

In this embodiment, a second stage relief valve is also provided in the reverse direction, i.e. upon build-up of hydraulic pressure on the lower side, as viewed. First stage pressure relief is provided by bending of the upper spring disc 47, and second stage relief by movement of the spring disc 47 upwardly against the effect of the spring stack 45.

Figure 7:
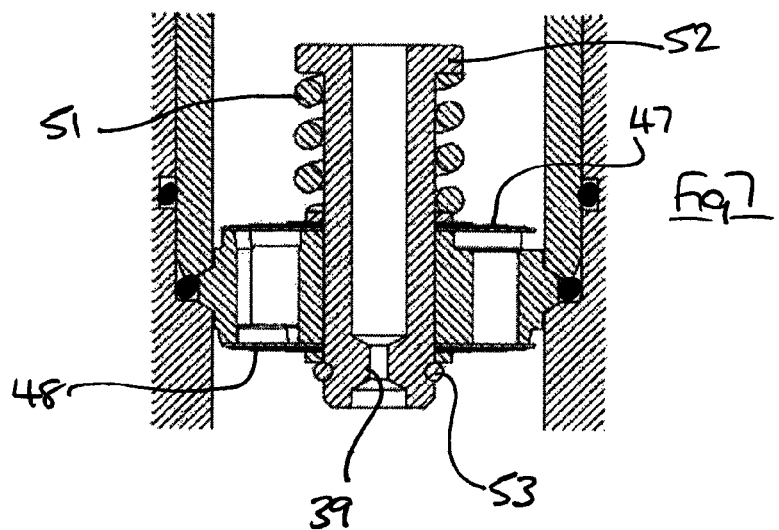
FIG. 7 is a transverse section through a second embodiment according to the invention.

The arrangement of FIG. 7 is substantially identical to that of FIG. 6 save that the spring stack 45 is replaced by a coil spring 51, and that adjustability provided by the threaded abutment 38 is removed. The sleeve 52 is unthreaded and the lower abutment is provided by a circlip or spring ring 53, which gives a fixed pre-load to the coil spring 51.

Operation of the embodiment of FIG. 7 is identical to that of FIG. 6, but the different spring characteristics of the coil spring 51 and spring stack 45 allow a different relationship between hydraulic pressure and travel of the sleeve.

The flow control valve may be inserted in the hydraulic line 15 in either direction according to the requirements of use. In use the relief provided by movement of the sleeves 37, 52 is typically sequential to relief provided by bending of the spring discs 47, 48, and may be used for example to accommodate very high pressure. These relief stages may however overlap to some extent if desired.

Figure 8:
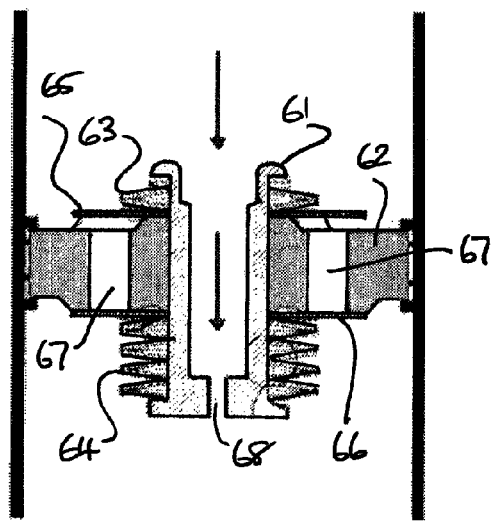
FIG. 8 is a transverse section through a third embodiment according to the invention in a first stage of operation.
Figure 9:
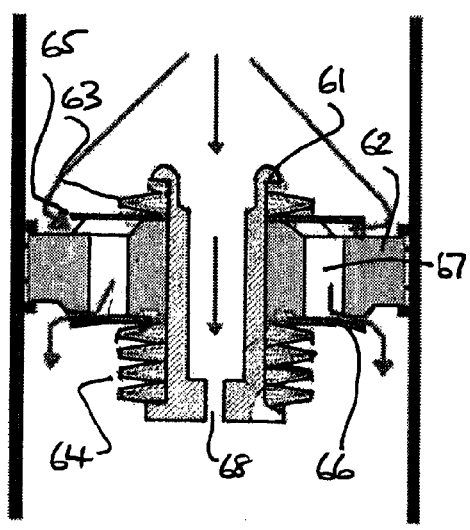
FIG. 9 is a transverse section through a fourth embodiment according to the invention in a second stage of operation.

FIGS. 8-9 illustrate a flow control valve having the characteristics of the valve of FIGS. 6 and 7, and with secondary pressure relief in both directions of flow.

The sleeve 61 floats at a position of mid-travel in the body 62 by virtue of stacks of Belleville spring washers 63, 64 on either side thereof. As illustrated in FIG. 8, the spring stacks exert a closing force on the spring discs 65, 66 so that the through passages 67 are normally closed in both directions. A throat 68 is provided in the sleeve 61, as before.

In use flow from one side of the valve to the other is initially damped by the throat 68 (flow from above illustrated in FIG.

8). As the volume of hydraulic fluid to be moved through the valve increases, pressure builds up and the spring disc 66 bends to allow a first stage of pressure relief, as illustrated in FIG. 9.

Figure 10:
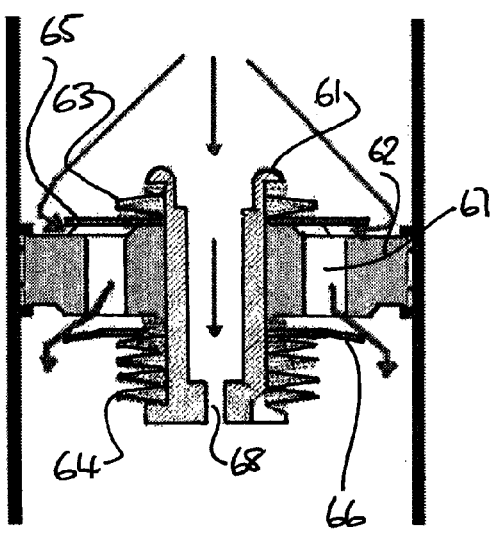
FIG. 10 is a transverse section though a fifth embodiment according to the invention in a third stage of operation.

A further increased in pressure causes the sleeve to move, thus permitting unseating of the respective spring disc 66, and a second stage of pressure relief, as illustrated in FIG. 10.

In the opposite direction, two-stage pressure relief is also provided, but the relief characteristic may be different, as demonstrated by the different number of spring washers in the spring stacks 65, 64. It will be understood that coil springs may also be used in the embodiment of FIGS. 8-10.

In the embodiments of FIGS. 8-10, the bore of the hydraulic duct may be around 36 mm, and the spring disc may be of spring steel, about 0.19 mm thick.

Figure 11:
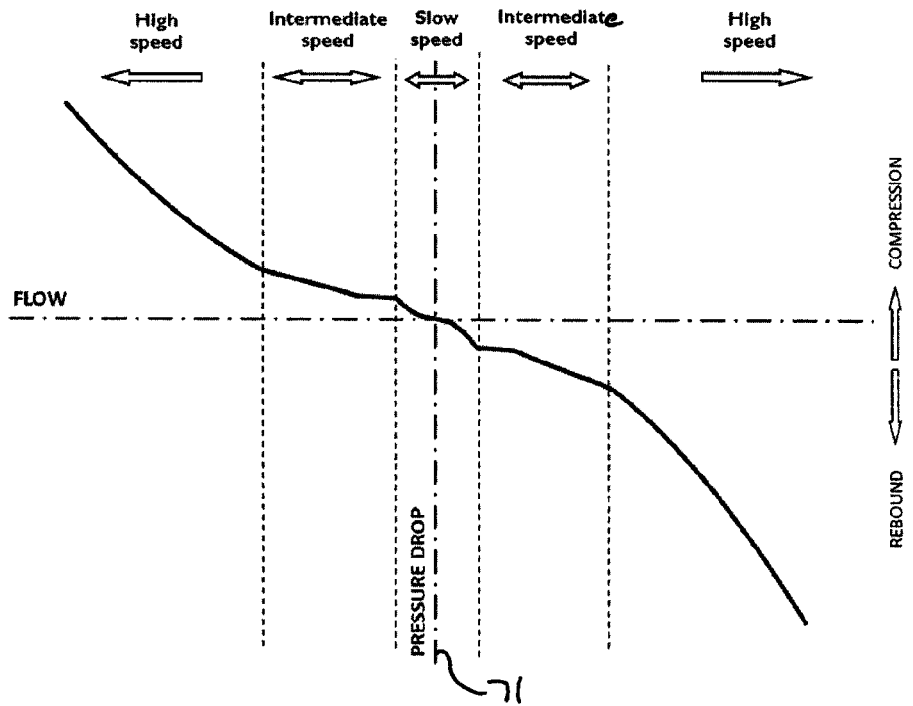
FIG. 11 shows the graphical relationship between operating speed and internal pressure drop in an embodiment of the invention, for both bounce and rebound.

A typical operating characteristic for the valve of the FIGS. 8-10 illustrated in FIG. 11.

The normally closed mid-condition of the valve is represented by chain-dot line 71.

For slow speed movement of the suspension in either direction, represented by a relatively small pressure drop, hydraulic flow is solely via the valve throat 68. At intermediate speeds, the volume of fluid is greater and accordingly the first stage of relief is provided via deformation of the respective spring disc 65, 66. At high speeds the second stage of relief is required via unseating to the respective spring disc 65, 66.

The characteristics for bump (compression) and rebound may be individually tuned so that the response on either side of the mid-condition may be different.

Figure 12:
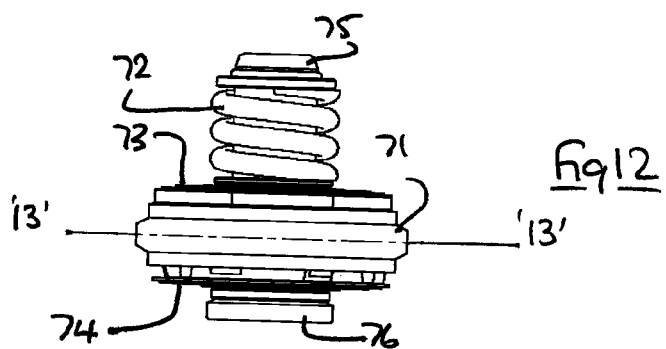
FIG. 12 shows inside elevation a sixth embodiment of the invention.

FIG. 12 illustrates a flow control valve insert in accordance with the invention, and substantially corresponding to the single acting embodiments of FIGS. 6 and 7. The body 71, coil spring 72, spring discs 73, 74, head 75 and abutment 76 can be clearly seen.

Figure 13:
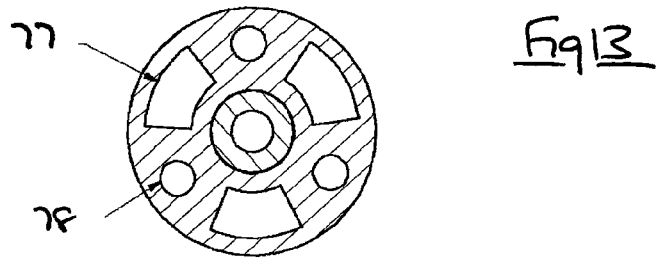
FIG. 13 is a diametral cross-section on line '13-13' of FIG. 12.

The cross-section of FIG. 13 shows one embodiment of through passages 77, 78 which are different in the bounce and rebound directions.

Figure 14:
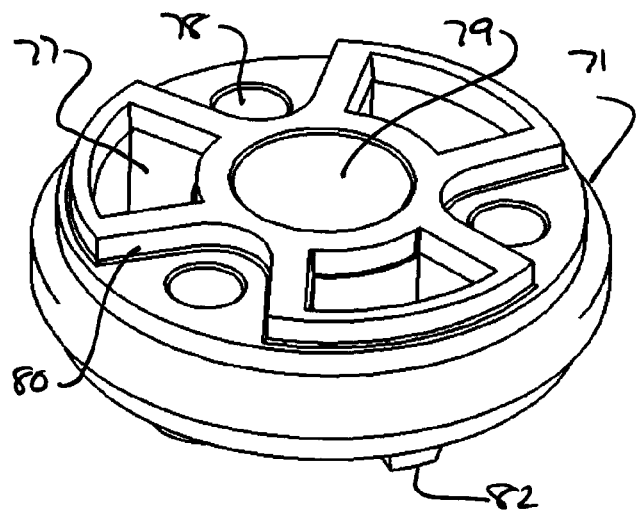
FIGS. 14 and 15 show perspective views of the valve body of FIG. 12 from above and below.
Figure 15:
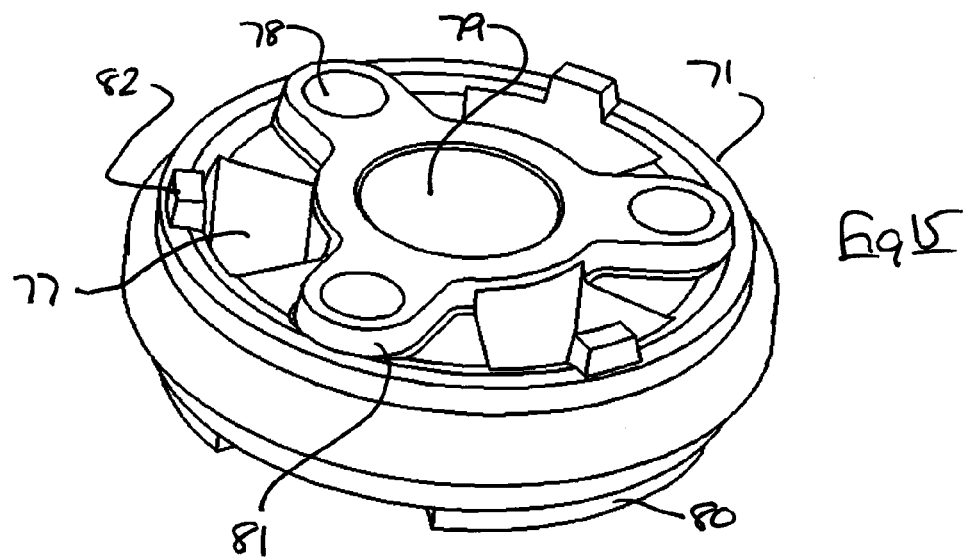

FIGS. 14 and 15 show perspective views of the valve body of FIG. 12 on an enlarged scale. The central bore 79 is defined for the moving sleeve, and the through passages 77, 78 are defined by respective upstanding walls 80, 81 which constitute a means of supporting the spring discs above the corresponding openings which correspond to the slots 24. Additional upstands 82 are provided on one side to support the corresponding spring disc. The valve body 71 may for example comprise an aluminium die casting.

Stages of operation of the flow control valve of FIGS. 12-15 are illustrated in FIGS. 16-21.

Figure 16:
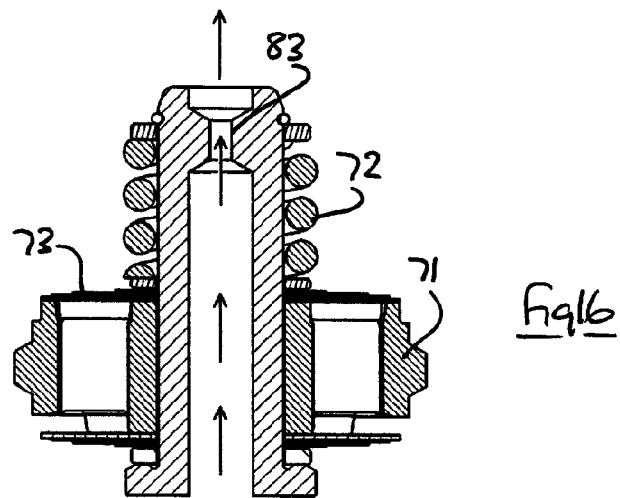
Figure 17:
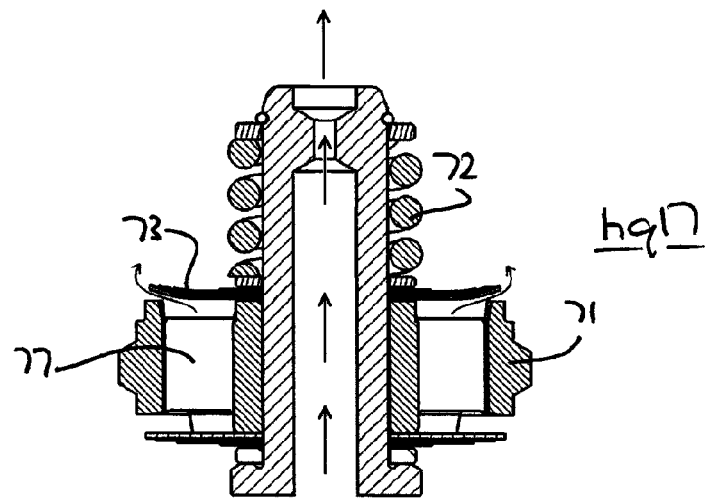
Figure 18:
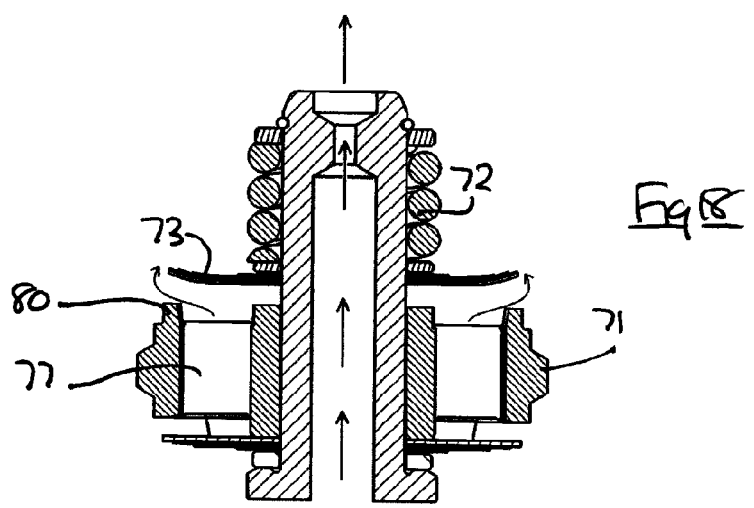

FIG. 16 shows low speed compression (bump) flow with hydraulic oil passing solely via restrictor 83. At medium speed, the spring disc 73 lifts at the edge to allow additional flow via the through passages 77. At high speed the build-up of pressure is sufficient to lift the spring disc 73 fully from the seat formed by wall 80 to allow a further increase in fluid flow.

During compression flow the spring disc 74 remains seated, thus blocking the corresponding through passages 78.

Rebound flow is illustrated in FIGS. 19-21, during which time the through passages 77 are blocked by the spring disc 73.

At low rebound speed flow is solely via the throat 83. At medium speed (FIG. 20), the spring disc 74 lifts at the edge to allow additional flow through the passages 78. At high speed (FIG. 21), the build-up of hydraulic pressure is sufficient to lift spring disc 74 fully from the seat formed by wall 81, to allow a further increase in fluid flow.

It will be appreciated that both instances of high flow cause compression of the coil spring 72, and the second stage relief may thus be identical for both directions of fluid flow.

In the described embodiments of FIGS. 6 to 9 and 16 to 21, an open through passage of a sleeve is depicted. However, this bypass passage may be provided in many other ways. For example, the passage may be around the perimeter of the valve body, for example by providing a "loose" diametral fit or a notch in the circumferential wall of the valve body, or duct in which it is contained. In another alternative a controlled bypass of a normally closed leaf spring may be provided, for example by means of one or more channels in the corresponding valve seat. Other alternatives will occur to a person skilled in the art of hydraulic valve design.

The invention claimed is:

1. A flow control valve for a hydraulic conduit, said valve comprising:
   a valve body having an open through passage defining a flow restriction, and an arcuate array of flow relief passages, each of said relief passages having at one side a closure comprising a leaf spring, and at least one said leaf spring being provided at each side of the valve body, and
   a piston arranged to reciprocate in said valve body, said piston having end abutments to limit travel thereof, said piston being resiliently biased in one direction to permit said one end abutment to seat a corresponding leaf spring at one side of said valve body, said piston being movable under increasing hydraulic pressure to unseat said corresponding leaf spring, thereby opening a respective relief passage.

2. A valve according to claim 1 wherein said array of relief passages is circular.

3. A valve according to claim 1 wherein one end abutment of said piston is axially adjustable.

4. A valve according to claim 3 wherein said one end abutment comprises a nut screw-threaded on the corresponding end of said piston.

5. A valve according to claim 1 wherein a circular leaf spring is provided on each side of the valve body, the periphery of said leaf spring being deformable under pressure to open one or more respective relief passages.

6. A valve according to claim 5 wherein resilient bias for said piston is provided by an annular spring acting between an end abutment and said body.

7. A valve according to claim 6 wherein said annular spring is a coil spring.

8. A valve according to claim 6 wherein said annular spring is a stack of Belleville spring washers.

9. A valve according to claim 8 wherein said stack comprises a plurality of spring washers arranged back to back.

10. A valve according to claim 6 wherein one of said circular leaf springs is directly seated by said annular spring.

11. A valve according to claim 6 wherein each said flow relief passage includes at one end a radially outwardly extending channel.

12. A valve according to claim 6 wherein a resilient bias for said piston is provided on both sides thereof by a respective annular spring acting between a respective end abutment and said body.

13. A valve according to claim 12 wherein the respective annular springs have a different pre-load.

14. A valve according to claim 12 wherein the respective annular springs have a different rate.

15. A valve according to claim 12 wherein said annular springs include a coil spring.

16. A valve according to claim 12 wherein said annular springs comprise stacks of Belleville spring washers.

17. A valve according to claim 12 wherein said annular springs directly seat a respective circular leaf spring.

18. A valve according to claim 1 wherein said open through passage is provided in said piston.

19. A flow control valve assembly, comprising:
   a through duct; and
   a flow control valve fixedly arranged in the through duct, the flow control valve comprising:
      a valve body having an open through passage defining a flow restriction, and an arcuate array of flow relief passages, each of said relief passages having at one side a closure comprising a leaf spring, and at least one said leaf spring being provided at each side of the valve body, and
      a piston arranged to reciprocate in said body, said piston having end abutments to limit travel thereof, said piston being resiliently biased in one direction to permit said one end abutment to seat a corresponding leaf spring at one side of said body, said piston being movable under increasing hydraulic pressure to unseat said corresponding leaf spring, thereby opening a respective relief passage.

20. A hydropneumatic suspension for a vehicle, the hydropneumatic suspension comprising:
   a hydraulic line between a wheel suspension actuator and a hydropneumatic spring chamber, and
   a flow control valve assembly inserted in the hydraulic line, the flow control assembly comprising:
      a through duct; and
      a flow control valve fixedly arranged in the through duct, the flow control valve comprising:
         a valve body having an open through passage defining a flow restriction, and an arcuate array of flow relief passages, each of said relief passages having at one side a closure comprising a leaf spring, and at least one said leaf spring being provided at each side of the valve body, and
         a piston arranged to reciprocate in said body, said piston having end abutments to limit travel thereof, said piston being resiliently biased in one direction to permit said one end abutment to seat a corresponding leaf spring at one side of said body, said piston being movable under increasing hydraulic pressure to unseat said corresponding leaf spring, thereby opening a respective relief passage.

* * * * *